United States Patent [19]
Schwan et al.

[11] Patent Number: 5,470,260
[45] Date of Patent: Nov. 28, 1995

[54] SMART CARD CONNECTOR

[75] Inventors: Rainer Schwan, Einlhausen; Rudi Krämer, Lautertal, both of Germany

[73] Assignee: The Whitaker Corporation, Wilmington, Del.

[21] Appl. No.: 213,418

[22] Filed: Mar. 15, 1994

[30] Foreign Application Priority Data

Mar. 25, 1993 [GB] United Kingdom ............... 9306177

[51] Int. Cl.⁶ .................................................. H01R 23/70
[52] U.S. Cl. ................................................. 439/630; 439/17
[58] Field of Search ............................. 439/259, 260, 439/630, 17, 70–72, 660, 296, 297

[56] References Cited

U.S. PATENT DOCUMENTS 4,469,385  9/1984  Retit et al. ............................ 439/630
4,900,272  2/1990  Lange et al. .
5,281,148  1/1994  Thompson ............................ 439/630
5,321,583  6/1994  McMahon ............................. 439/17

Primary Examiner—David L. Pirlot
Attorney, Agent, or Firm—Adrian J. LaRue; Eric J. Groen

[57] ABSTRACT

An electrical connector for electrically connecting to conducting circuit traces on a card, includes contact wheels rotatably mounted on resilient cantilever arms. The wheels project into a card receiving slot of the connector such that when the card is inserted therein, the wheel contacts are resiliently biased out of the slot to press against a surface of the card, whereby further insertion thereof causes the contact wheels to roll over the surface of the card thereby avoiding rubbing of the contact surfaces whilst nevertheless maintaining suitable contact pressure.

7 Claims, 4 Drawing Sheets 5,470,260

SMART CARD CONNECTOR

BACKGROUND OF THE INVENTION

1. Field of the Invention

The invention relates to an electrical connector which can be mounted to a printed circuit board and which can receive a memory card, and more particularly related to a connector with reduced contact rubbing-wear.

2. Description of the Prior Art

It is quite common for various security systems to include memory cards, or so called "smart cards" for interconnection to an associated connector. This memory card has active devices mounted on the circuit card which are interconnected to electrical traces on the printed circuit card. The circuits generally carry an access code on the circuit card. The cards are then inserted into the system, which may be a car radio or telephone, or which may be an access panel which will unlock the door to a secured area within a building.

Due to the frequent use of these cards, one of the requirements is that the contacts and card circuit traces can withstand a large number of contacting cycles. To achieve this requirement, it is necessary to avoid or considerably reduce the rubbing action of the connector contacts on the card circuit traces.

SUMMARY OF THE INVENTION

With reference to the above mentioned requirements, the object of this invention is to provide an electrical connector for electrical connection with circuit traces on a memory card whereby rubbing between the connector contacts and the card circuit traces is avoided.

Another object of this invention, is to provide the above connector in such a way that it can be easily manufactured and yet remain reliable.

Yet another object of this invention is to provide a card connector for reduced contact rubbing wear that is compact and cost-effective.

The above mentioned objects have been achieved by providing an electrical connector for electrical connection between circuit traces of a card and the connector, the connector having a slot profiled for receiving the card therein, the connector characterized in that the connector has resilient electrical contacting members, the contacting members having resilient arms and rotatable wheels attached thereto, the wheels projecting into the slot when the card is not therein, the wheels rotatable over the card during insertion of the card into the slot, the wheels resiliently biased against the card circuit traces when the card is fully inserted.

DETAILED DESCRIPTION OF THE PREFERRED EMBODIMENT

Figure 5:
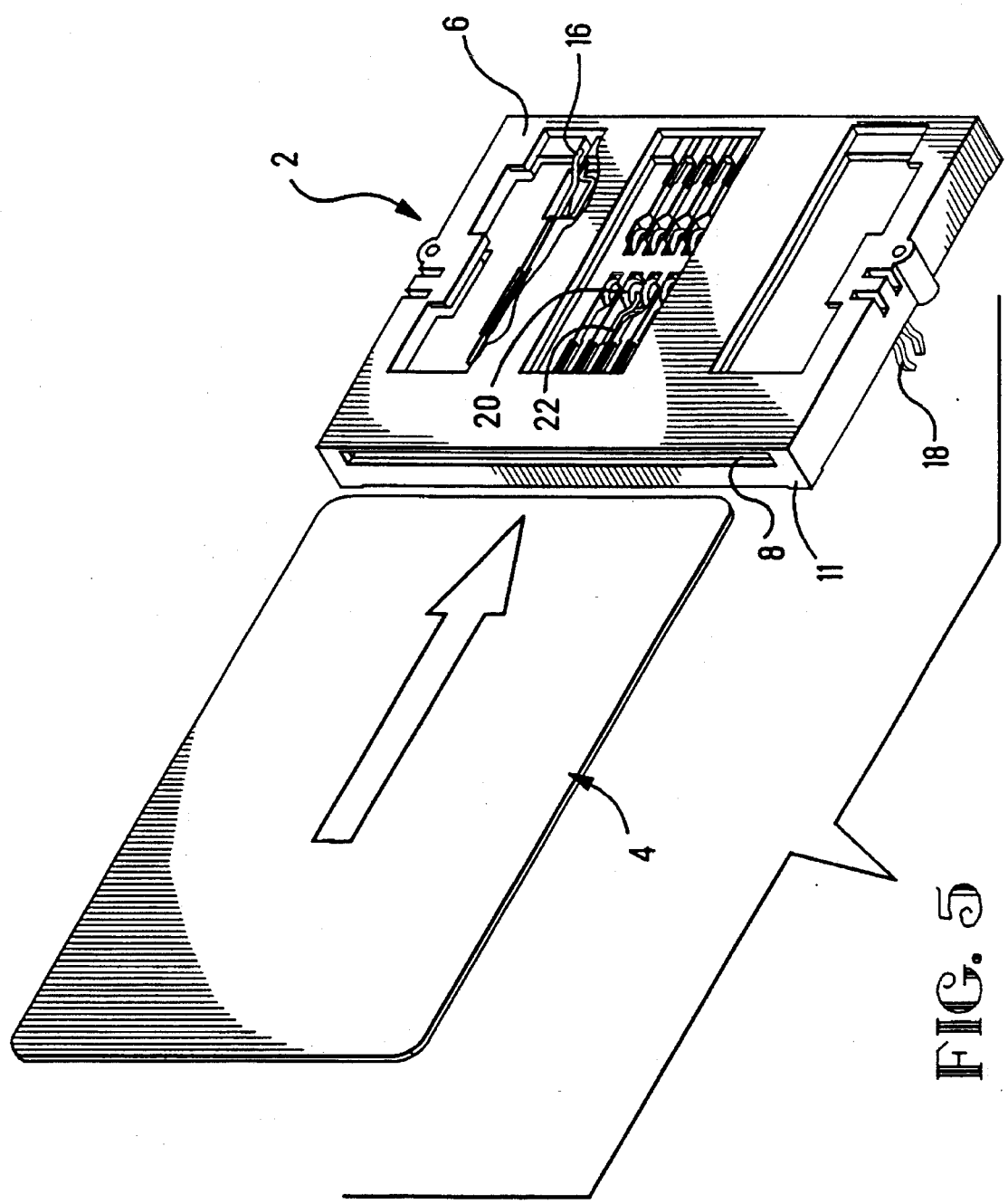
FIG. 5 is an isometric view of a card and the preferred embodiment of this invention, the card about to be inserted into a receiving slot of the connector.

With reference to FIG. 5, an electrical connector is generally shown at 2 and a substrate card for insertion into the connector is generally shown at 4. The connector 2 is shown having a housing 6, a slot 8 profiled for receiving the card 4 at a front edge 11 of the connector 2, contacts 12 that project into the slot cavity 8 through contact cavities 14, a read-in contact 16, and a board lock feature 18 for mounting the connector 2 on a printed circuit board.

Figure 3:
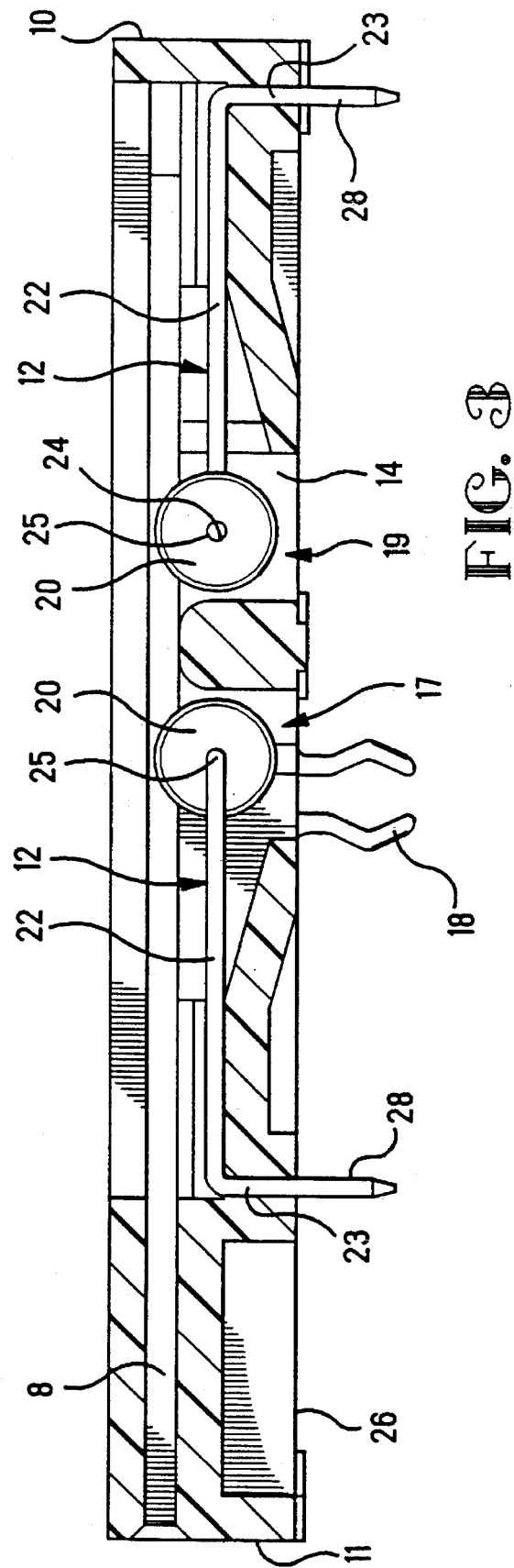
FIG. 3 is a cross-sectional view taken through the line 3—3 shown in FIG. 1.

In FIG. 3 the contacts 12 are shown having contact wheels 20 rotatably mounted to resilient arms 22. The resilient arm 22 is shown in the preferred embodiment to be a cantilever spring attached at a fixed end 23 to the housing 6 and the free end is an axle 25 bent into a central hole 24 in the wheel 20, such that the wheel can rotate thereabout. To make electrical contact with a printed circuit board, the resilient arms 22 are bent at their fixed ends 23 so that pins 28 project outwards of a base 26 of the housing 6, the base 26 being mounted substantially against a top surface 27 of the printed circuit board 1 shown in FIG. 4, the pins 28 projecting into corresponding holes 30 of the printed circuit board 1. The pins 28 are electrically connected to the electrical circuit traces of the printed circuit board by soldering, in the preferred embodiment, although well known solderless connection methods such as press fit can also be used. The board lock feature 18 prevents the connector 2 from falling off the printed circuit board 1 during the assembly operations of the various electrical devices that are mounted to the printed circuit board 1. The resilient arm 22 of the preferred embodiment is formed from cylindrical wire which advantageously requires no particular preparation of the axle 25 which is advantageously round for smooth rotation of the wheel 20 therearound.

In the preferred embodiment, the plurality of contacts 12 are disposed in two rows 17,19. This disposition not only reduces the width taken up for use by the contacts 12 to make electrical connection with the card 4, but also reduces the insertion force of the card 4 into the connector 2. Increased insertion force is required when the front edge of the card first touches the contacts 12 and lifts them onto the surface of the card against the resiliency of the resilient arms 22. By reducing the number of contacts that are simultaneously lifted by the front edge of the card during insertion, as with the preferred embodiment, one therefore reduces the insertion force thereof.

In order to have a suitable resiliency and sufficient deflection of the wheel 20 out of the slot 8 when the card 4 is inserted therein, the resilient arm 22 is provided quite long. In the preferred embodiment tight spacing of the two rows 17,19 of contacts is desired, one way of achieving this by disposing the contacts in an opposing manner due to the long resilient arms 22.

Electrical connection between the card circuit traces and the contacts 12 is made by inserting the card 4, correctly disposed, into the connector slot 8. During insertion, the first row 17 of wheels 20 are biased resiliently over the front edge of the card 4 until the row 17 of wheels 20 are pressing on the contacting surface of the card, further insertion of the card 4 making the first row of wheels roll thereover, the second row 19 of contacts 12 further on, also biased resiliently onto the surface of the card and also rolling over the surface of the card 4 until the card reaches the end of the slot. Rolling of the contact wheels 20 reduces the wear of the card circuit traces and wheel contacting surfaces because there is no rubbing, but nevertheless maintaining a sufficient normal contact pressure between the contacts and the card circuit traces due to the resilient biasing of the resilient arms 22 that support the wheel 20. During extraction of the card from the slot 8 the contact wheels 20 roll thereoff, once again avoiding any rubbing action between the card 4 and connector contacts 12.

Figure 4:
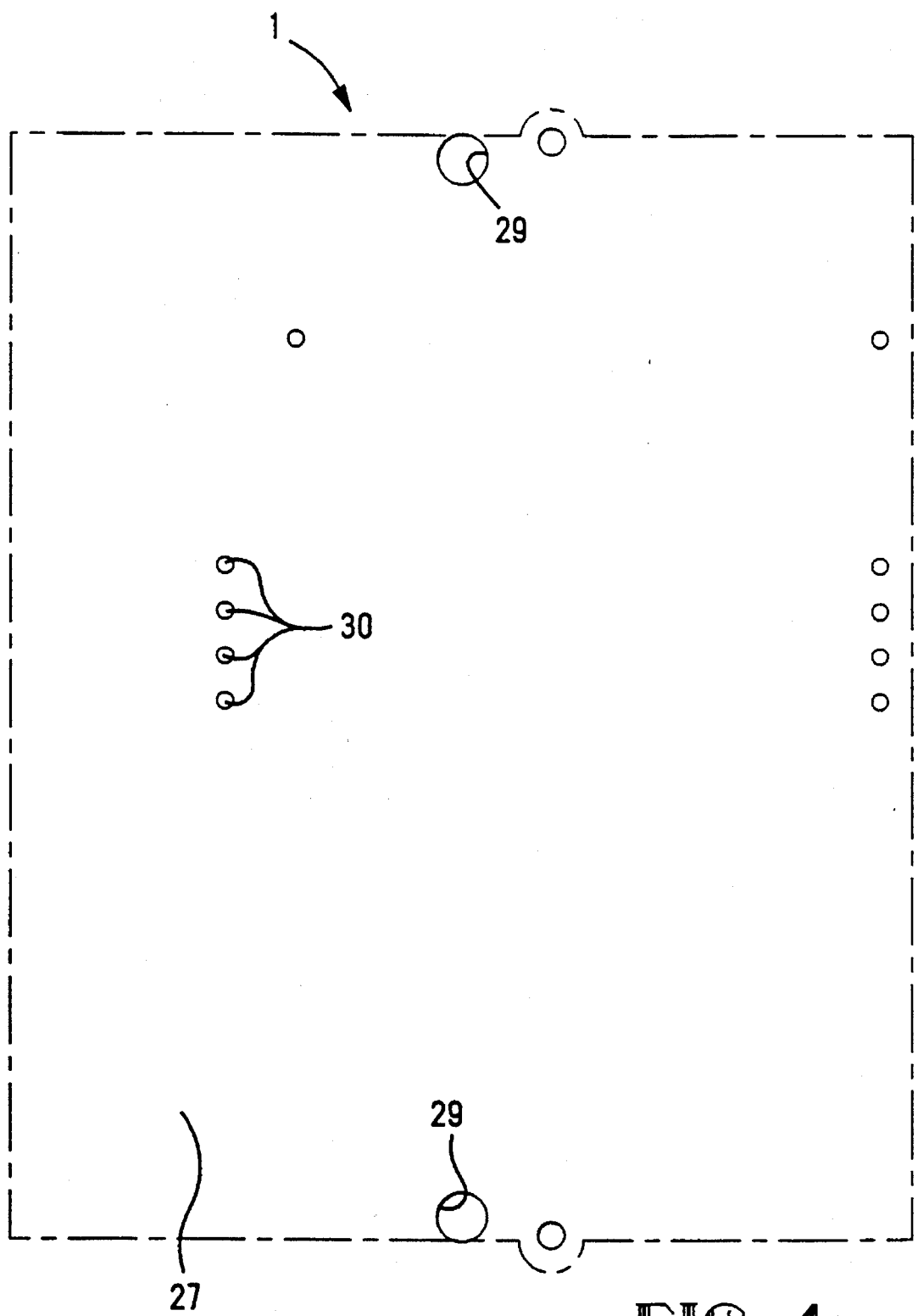
FIG. 4 is a top plan view of the holes in a printed circuit board necessary to mount the preferred embodiment of the connector.

FIG. 4 shows the layout of the holes in the printed circuit board to which the preferred embodiment of this invention is mounted. Little holes 30 are to receive the contact pins 28 of the connector 2, and larger holes 29 are for the insertion of the board lock members 18 of the connector 2.

Figure 1:
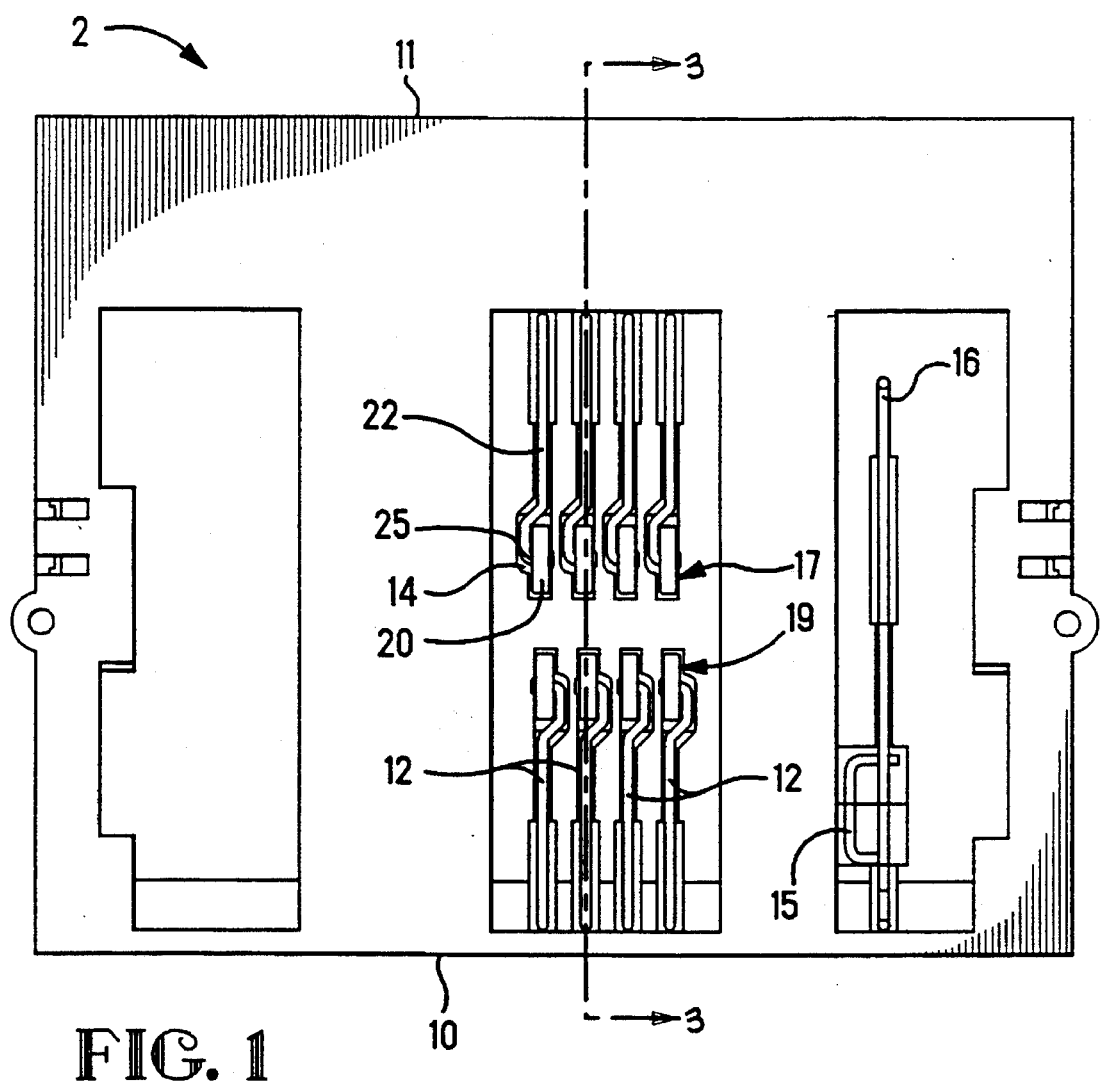
FIG. 1 is a plan view of the top of the preferred embodiment of this invention.
Figure 2:
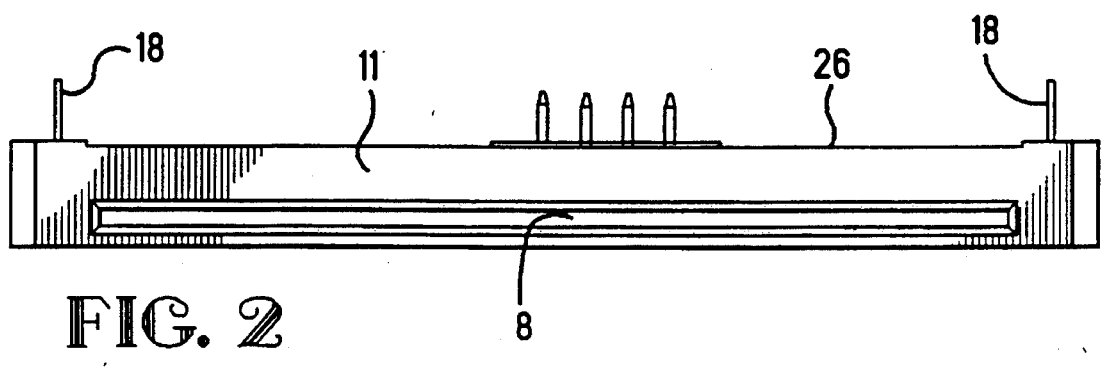
FIG. 2 is a front view of the preferred embodiment.

In FIG. 5 and FIG. 1 the read-in contact 16 is shown and detects the presence of the card fully inserted into the connector slot 8. In the preferred embodiment the read-in contact 16 is a long resilient cantilevered wire that projects into the slot of the connector 2 such that once the card 4 is partially inserted into the slot 8, the read-in contact 16 is biased up over the surface of the card and breaks (or breaks) electrical connection with a corresponding contact 15, thus making the presence or non-presence of the card 4 detectable.

It should be appreciated that the card connector 2 as described herein is only representative of the preferred embodiment of the invention and should not be limiting to the claimed invention. More specifically: The connector 2 could be electrically connected to electrical conducting cables and not mounted on a printed circuit board 1, the compactness and disposition of the contacts 12 could be varied, and the length and bent shape of the resilient arms 22 could also be varied.

We claim:

1. An electrical connector for electrical connection between electrical circuit traces of a substrate card and electrical circuit traces of a printed circuit board, the electrical connector having a slot profiled for receiving the card therein, and contact members for interconnection to the traces of the printed circuit board, the electrical connector being characterized in that the contact members are electrically connected to contact roller members positioned proximate to said slot, whereby said contact roller members can roll along said printed circuit card during insertion thereof, into engagement with said traces on said printer circuit card, and where contact roller members are defined by resilient electrical contacting members having resilient arms and rotatable wheels, the wheels projecting into the slot when the card is not therein, the wheels rotatable over the card during insertion of the card into the slot, the wheels resiliently biased against the card circuit traces when the card is fully inserted into the slot.

2. The connector of claim 1 characterized in that the resilient arm is a cantilevered beam whereby a fixed end is attached to the connector, and to an axle end is rotatably attached the wheel.

3. The connector of claim 1 characterized in that the resilient arm includes a pin and an axle to which is rotatably attached the wheel comprises only one piece.

4. The connector of claim 1 characterized in that the resilient arm is made from substantially cylindrically shaped wire.

5. The connector of claim 1 characterized in that the contact members are disposed in two spaced apart mirror image rows.

6. The connector of claim 1 characterized in that the connector: has a base mountable substantially against the printed circuit board, whereby the resilient arm makes direct electrical contact between the wheel and the printed circuit board circuit traces.

7. The connector of claim 6 characterized in that the resilient arms comprise pins projecting from the base and mountable through corresponding holes in the printed circuit board to make electrical contact therewith.

\* \* \* \* \*